Patented Apr. 26, 1927.

1,626,134

UNITED STATES PATENT OFFICE.

MICHEL DEVIGNY, OF PARIS, FRANCE.

METHOD OF MANUFACTURE OF CUT MATRICES ADAPTED FOR THE PRODUCTION OF PHOTOGRAPHIC SURFACES COMPRISING REFRACTING ELEMENTS.

No Drawing. Application filed November 10, 1925, Serial No. 68,228, and in France December 22, 1924.

In the French Patent No. 399,762 of May 1st, 1908, there has been clearly set forth the utilization of refracting elements formed on the surface of a plastic substance the other side of which is coated with a suitable photographic emulsion, for the reproduction of objects in natural colours.

It has already been proposed to employ engraved matrices to form the said refracting elements upon the surface of a plastic substance.

In the different methods for the manufacture of the said matrices, engraving is always employed for producing a pattern wheel having in high relief the refracting elements which are to be reproduced in sunken relief upon the finished matrix, which latter in turn is used to form raised patterns, known as checkered or honeycomb work, upon plastic material, and chiefly for the manufacture of cut films or cinematographic films.

In the said methods, the manufacture of the pattern wheel is a difficult operation. The tempering of the wheel, in order to impart to it a sufficient hardness, is very complicated, for aside from the resulting deformations which are almost unavoidable, and are caused by the tempering of the steel, the heating of the wheel to the degree necessary for the tempering will result in oxidations and calcinations whereby the relief patterns may be reduced to such a point as to render the wheel useless.

Furthermore, when the tempered wheel is once produced, it must be applied to the cylinder which is to form the matrix for producing the pattern upon the plastic material.

The wheel is moved against the cylinder by a turning like operation, so that the pattern formed on the surface of the cylinder will have the shape of a helical line whose spiral turns are united.

If a cylinder of this kind is used to form the pattern upon a film, it is observed that the helical spiral will give to the surface of the film lines which are more or less pronounced, thus forming more or less regular streaks which are oblique to the longitudinal axis of the film. If a film of this kind is projected upon the screen, due to its motion in the apparatus there will be formed on the screen a continuous series of oblique shadows which move across the screen from one edge to the other, and which impair to the sharpness and the clear nature of the projected views.

By my new method, these drawbacks are successfully obviated.

In order to dispense with the use of the engraved wheel and the complicated tempering operation, I employ a cylinder made of a steel having a suitable composition, this being tempered after it has been turned on the lathe. The tempered cylinder is then carefully rectified by well known methods. Its generatrix is somewhat longer than the width of the plastic substance upon which the pattern is to be formed.

The cylinder is mounted upon an accurate scale dividing machine, and by means of a diamond point of suitable shape, I form according to the generatrices—as in the case of gearing with very fine teeth—grooves having the proper shape and depth, whose number is about 25 per linear millimeter, or more if necessary.

When the whole surface of the cylinder has been cut in this manner, the diamond point is turned through 90 degrees, and the cylinder is rotated so as to cut suitable grooves upon its surface which are perpendicular to the generatrices; the latter grooves are in the same number per linear millimeter as the aforesaid grooves which were cut according to the generatrices.

When the two sets of grooves have been formed in this manner, I obtain on the surface of the cylinder a series of small pyramids having a four-sided base.

Inasmuch as I employ tempered steel for the cylinder, whilst the cutting tool consists of a diamond point of suitable shape, a wheel serving to produce the pattern cylinder can be obtained by two mechanical operations, without engraving and without subsequent tempering.

Thus, in my method of manufacturing the pattern wheel by cutting upon tempered steel, I eliminate the deformations, due to tempering, which occur in the engraving process; the said method also offers a mathematical regularity such as can be obtained by the accurate machines of the well known types, and if necessary I can retouch the cutting work either to rectify its shape or to increase the depth, which is practically impossible in the known engraving methods, due to the fineness of the elements.

When the pattern wheel has thus been produced, it is conveyed upon a cylinder made of a steel having the proper composition and hardness, which thus constitutes the pattern cylinder. But this conveying operation is not performed by means of a slide and a turning operation, as is the case in the known engraving processes, but by the rolling action of the pattern wheel (milling wheel).

The cut milling wheel, whose diameter is less than that of the operative part of the pattern cylinder—which has been preliminarily rectified with accuracy—is placed against the said cylinder. The pattern is produced upon the cylinder by the rolling process, the operation being optionally repeated until the proper sunken relief has been obtained.

This is another advantage over the known engraving methods wherein the helical movement of the pattern wheel makes it difficult, and even impossible, to again proceed over the pattern.

Inasmuch as the said wheel has the same width as the operative part of the pattern cylinder, and as the pattern is formed on said cylinder by a rolling motion and not by a helical turning, the surface of the film which is treated by means of the cylinder, will no longer offer the aforesaid streaks which are oblique to its longitudinal axis, and thus during the projection I eliminate all oblique shadows on the screen, such as are known to interfere with the fine quality and the sharpness of the views, and whose synchronous repetition becomes troublesome and fatiguing to the spectator.

In the usual engraving methods, the surface of the pattern cylinder consists of small cones in sunken relief whose bases are united. The circles forming the bases of said cones are not in the tangent position, but due to the flattening of the metal when the initial engraving is performed, the circles will become deformed, whereby the boundaries of the cone bases will approximately form small hexagons.

In my new cutting process, I obtain pyramids with square bases, this having no effect as regards the optical functioning of the refracting element.

When patterns are to be formed upon films which are used to reproduce the original films, the wheel for producing the patterns on said films should be cut in such a manner that the diagonals of the bases of the pyramids of the new pattern cylinder shall be inclined at 45 degrees to the diagonals of the bases of the pyramids forming the refracting network of the film to be reproduced. I thus eliminate all formation of streaked or watered places which are sure to be produced when one seeks to superpose networks or gratings which have a like axial direction.

This pattern wheel is produced by cutting a tempered and rectified steel cylinder with a shaped diamond point, but the grooves cut therein will have a 45-degree inclination with reference to its generatrices and its bases.

I claim:

1. The method of manufacturing matrices for the production of photographic surfaces comprising refracting elements, which consists in tempering, rectifying, and cutting a pattern wheel, rectifying a pattern cylinder, and rolling the pattern wheel on the pattern cylinder.

2. In the method defined in claim 1, cutting the pattern wheel by first cutting grooves therein, and then cutting additional grooves substantially perpendicularly disposed to the first mentioned grooves.

3. In the method of making patterns on films for reproducing an original film the step of cutting grooves in the pattern wheel which are angularly disposed to the grooves in the refracting network of the original film.

4. In the method of making patterns on films for reproducing an original film the step of cutting grooves in the pattern wheel which are disposed at an angle of forty-five degrees to the grooves in the refracting network of the original film.

In testimony whereof he has affixed his signature.

MICHEL DEVIGNY.